(12) United States Patent
Leger et al.

(10) Patent No.: US 10,850,234 B2
(45) Date of Patent: Dec. 1, 2020

(54) TANK TUBE BRACKET FOR A TANK WITH A DIVERTED DISCHARGE OPENING

(71) Applicant: MEAS France, Toulouse (FR)

(72) Inventors: Vincent Leger, Toulouse (FR); Loic Mathieu, L Isle Jourdain (FR); Florent Gaunard, Toulouse (FR); Armand Castandet, Toulouse (FR)

(73) Assignee: MEAS FRANCE, Toulouse (FR)

( * ) Notice: Subject to any disclaimer, the term of this patent is extended or adjusted under 35 U.S.C. 154(b) by 0 days.

(21) Appl. No.: 16/177,875

(22) Filed: Nov. 1, 2018

(65) Prior Publication Data

US 2019/0136807 A1 May 9, 2019

(30) Foreign Application Priority Data

Nov. 3, 2017 (EP) .................................... 17306527

(51) Int. Cl.
| | |
|---|---|
| *B01D 53/92* | (2006.01) |
| *B60K 15/077* | (2006.01) |
| *B01D 19/00* | (2006.01) |
| *F02M 37/00* | (2006.01) |
| *B60K 15/03* | (2006.01) |

(52) U.S. Cl.
CPC ......... *B01D 53/92* (2013.01); *B01D 19/0031* (2013.01); *B60K 15/077* (2013.01); *F02M 37/0017* (2013.01); *B60K 15/03* (2013.01); *B60K 2015/0348* (2013.01); *B60K 2015/03243* (2013.01); *F01N 2610/1406* (2013.01); *Y10T 137/86348* (2015.04); *Y10T 137/86372* (2015.04)

(58) Field of Classification Search
CPC ............ B01D 53/92; Y10T 137/86348; Y10T 137/86372; Y02T 10/26; F01N 2610/1406; F02M 37/0017; B60K 15/077; B60K 2015/0348
See application file for complete search history.

(56) References Cited

U.S. PATENT DOCUMENTS

| | | | | |
|---|---|---|---|---|
| 2,983,311 A | * | 5/1961 | Anders | B60K 15/00 55/434 |
| 3,707,263 A | * | 12/1972 | Baumgartner | B60H 1/2203 237/12.3 C |
| 4,127,143 A | * | 11/1978 | Zinga | B05C 11/11 137/592 |
| 2014/0283933 A1 | * | 9/2014 | Andvik | F01N 3/208 137/561 A |
| 2016/0273429 A1 | * | 9/2016 | Nihongi | F01N 3/2066 |

FOREIGN PATENT DOCUMENTS

| | | |
|---|---|---|
| DE | 2602234 B1 | 4/1977 |
| DE | 4123367 A1 | 1/1993 |
| GB | 1515800 | 6/1978 |
| GB | 2172864 A | 10/1986 |
| WO | 8907712 A1 | 8/1989 |

OTHER PUBLICATIONS

Extended European Search Report, dated May 22, 2018, 6 pages.
Abstract of DE4123367, dated Jan. 21, 1993, 1 page.

* cited by examiner

*Primary Examiner* — Atif H Chaudry

(57) ABSTRACT

A tank tube bracket for a tank comprises a receptacle extending along an axis and receiving a tank tube and a passage adapted to pass a fluid through the tank tube bracket. A distal end of the passage is directed toward the axis of the receptacle.

15 Claims, 2 Drawing Sheets

TANK TUBE BRACKET FOR A TANK WITH A DIVERTED DISCHARGE OPENING

CROSS-REFERENCE TO RELATED APPLICATION

This application claims the benefit of the filing date under 35 U.S.C. § 119(a)-(d) of European Patent Application No. 17306527.7, filed on Nov. 3, 2017.

FIELD OF THE INVENTION

The present invention relates to a tank tube bracket and, more particularly, to a tank tube bracket for a tank with a diverted discharge opening.

BACKGROUND

Tank tubes used for diesel or reactive-fluid tanks, such as a urea tank, include but are not limited to vent tubes for venting the tank, suction tubes for pumping fluid out of the tank, tubes comprising a fluid level meter, and tank tubes which may be used to cool and/or heat the fluid in the tank. The tank tubes, when installed, extend vertically into the tank and may even reach into the fluid in the tank. The tank tubes are held by a tank/pump interface which provides connections to the tank tubes and simultaneously serves as a cover for an access opening of the tank.

In many applications, such as in combustion engines, the fluid is pumped from the tank to a consumer device, such as the combustion engine. In order to sufficiently provide a constant source of fluid to the consumer device, more fluid is pumped to the consumer device than is actually needed. Excessive fluid that is not consumed is discharged back into the tank.

The tank is often provided with a sensor device, which may be used for determining fluid quantity and/or fluid quality. The proper functioning of the sensor device may be impaired by the presence of air bubbles in the stream. The air bubbles may be introduced by the excessive fluid which is discharged back to the tank. There is a need to guide fluid back into the tank without introducing too many air bubbles that may impair the proper functioning of the sensor device.

SUMMARY

A tank tube bracket for a tank comprises a receptacle extending along an axis and receiving a tank tube and a passage adapted to pass a fluid through the tank tube bracket. A distal end of the passage is directed toward the axis of the receptacle.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
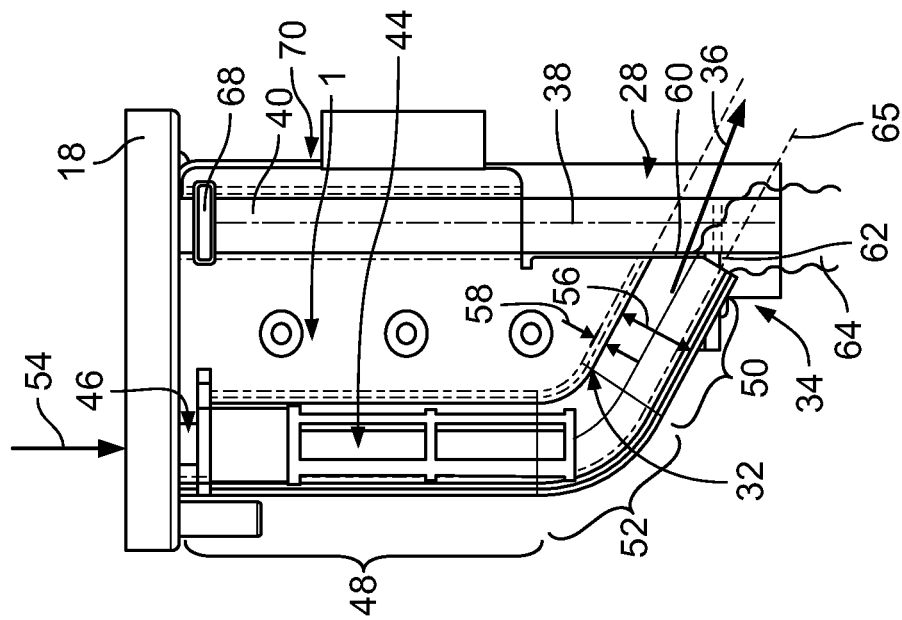
FIG. 2 is a front view of the tank tube bracket of FIG. 1.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 1:
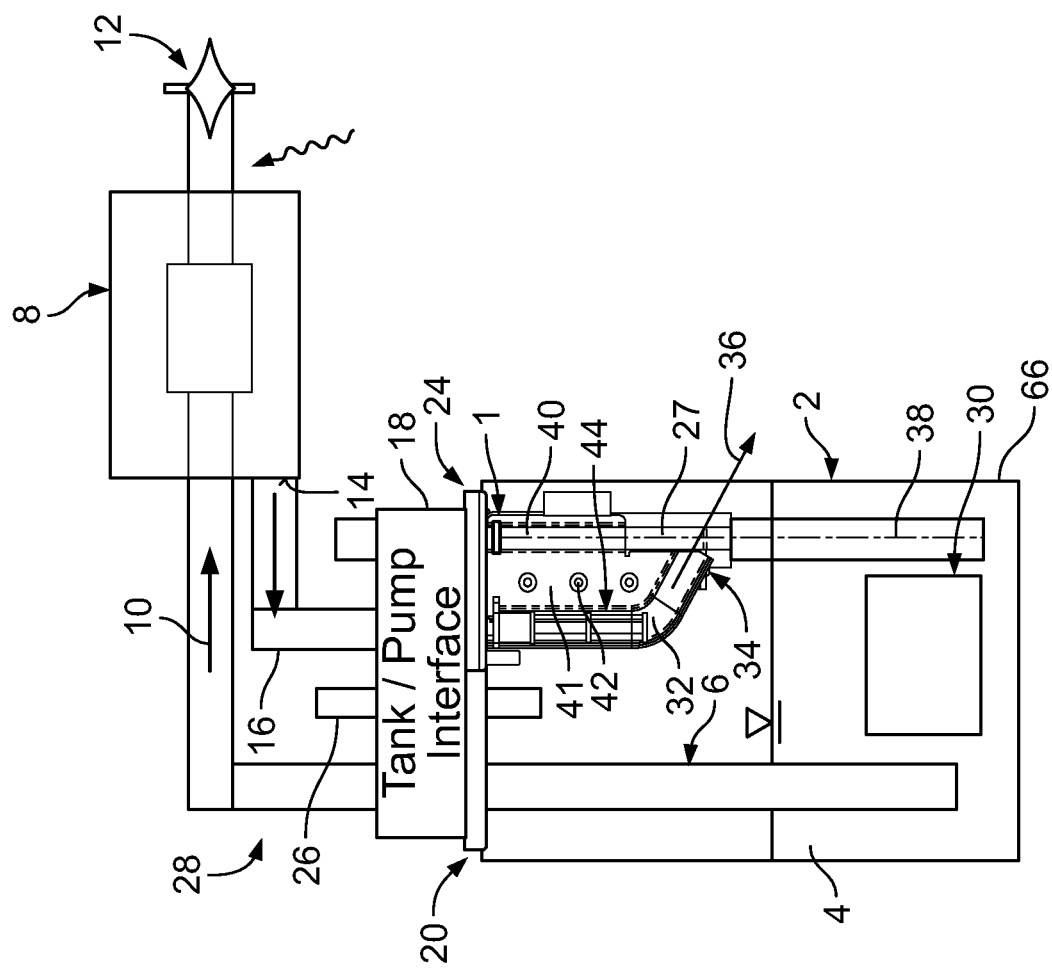
FIG. 1 is a schematic diagram of a tank tube bracket according to an embodiment with a pump and a tank.

A tank tube bracket 1 according to an embodiment is shown in FIG. 1. The tank tube bracket 1 is used in a tank 2 which may contain a fluid 4 such as a reactive fluid. The reactive fluid may be urea or a combustion fluid such as diesel. The fluid 4 is pumped in a flow direction 10 from the tank 2 via a suction line 6 by a pump 8. The fluid 4 is pumped by the pump 8 to a consumer device 12, for example, an internal combustion engine. In order to ensure a sufficient supply of fluid 4 to the consumer device 12 at all times, the pump 8 may convey more fluid 4 than the consumer device 12 actually consumes. Thus, excess fluid 4 needs to be pumped back into the tank 2 from a discharge outlet 14 of the pump 8 via a discharge line 16. In such a configuration, the pump 8 actually comprises two circuits, one including the tank 2 and the other including the consumer device 12.

The tank 2, as shown in FIGS. 1 and 2, has a tank/pump interface 18 which may close at least one part of a side 20 of the tank 2. In the shown embodiment, the tank/pump interface 18 is configured as a cover 22 closing and sealing an access opening 24 of the tank 2. The tank/pump interface 18 provides support for the suction line 6, the discharge line 16, a vent tube 26 and a heating tube 27. A tank tube 28 as described in the following may constitute either the vent tube 26 or the heating tube 27. In other embodiments, the tank tube 28 may be the vent tube 26, a tube for measuring fluid level, a suction tube, or the heating tube 27.

The heating tube 27 may not necessarily be used for heating the fluid 4 but also may be used for cooling the fluid 4. The tank/pump interface 18 provides connections to these devices and possibly other components, which are located in the tank 2, such as a sensor device 30 for determining the quantity and/or quality of the fluid 4 in the tank 2. The quality of the fluid 4 may, for example, be determined to make sure that the fluid 4 in the tank 2 conforms to operational or legal conditions. The quantity of the fluid 4 may be used to determine when the tank 2 needs to be refilled. It is only for exemplary purposes that the bracket 1 is shown mounted to the heating tube 27.

The function of the sensor device 30 may be impaired by the presence of bubbles in the fluid 4. Therefore, the tank tube bracket 1 is configured to avoid or at least reduce the introduction of bubbles in the fluid 4 by the fluid 4 which is led back into the tank 2 through the discharge line 16. At the same time, the tank tube bracket 1, via a housing 41 of the tank tube bracket 1, may provide a thermal bridge between the tank tube 28 and the discharge line 16, which is particularly useful if the tank tube 28 is a heating tube.

The discharge line 16, as shown in FIGS. 1 and 2, continues within the tank tube bracket 1 in a passage 32 having a distal end 34 from which the fluid 4 is discharged into the tank 2 as a fluid stream 36. The passage 32 may either itself form a fluid line or may be used to receive a fluid line. As shown in FIG. 1, the passage 32 is directed towards the tank tube 28. The tank tube 28 is at least partly received in a receptacle 40.

The receptacle 40 may be used to mount the tank tube bracket 1 onto the tank tube 28, to mount the tank tube 28 onto the tank tube bracket 1 and/or to create a contact between the tank tube bracket 1 and the tank tube 28, for example, to allow heat transfer between the two. To this end, the tank tube bracket 1 is made at least partly from thermally conductive material, for example, a material consisting of or containing a metal such as aluminum, iron, copper and/or tin. Heat is thus transferred from the tank tube 28 to the passage 32 and from there to the fluid 4 in the passage 32.

In various embodiments, the tank tube bracket 1 may be a monolithic molded part or may consist of two or more pieces, which are held together by fixing elements 42 shown in FIGS. 1 and 2, such as rivets or bolts. According to one exemplary embodiment, two halves of the housing 41, of which the dividing plane may cross both the passage 32 and the receptacle 40, may be joined by the fixing elements 42 to form the tank tube bracket 1. The housing 41 forms at least a part of the receptacle 40 and the passage 32.

As shown in FIG. 1, the distal end 34 of the passage 32 is not located directly above the sensor device 30. Thus, any fluid dripping from the distal end 34 into the fluid 4 at the bottom of the tank 2 does not create bubbles in the sensitive area directly above the sensor device 30. Moreover, the fluid stream 36 is directed away from the sensor device 30 or, respectively, from the area vertically above the sensor device 30. In the embodiment shown in FIGS. 1 and 2, the fluid stream 36 is directed onto the tank tube 28, so that it flows down the tank tube 28 into the fluid 4 at the bottom of the tank 2. This flow leads to an improved deaeration of the fluid 4. It further smooths the entry of the discharge fluid 4 into the tank 2. Each of these effects alone decreases the occurrence of bubbles in the fluid tank 2. If the tank tube 28 is a heating tube, the flow along the tank tube 28 in addition both heats or cools the discharged fluid 4 to the desired temperature. Further, to decrease the number of bubbles, in particular of microbubbles, an air bubble filter 44 may be inserted into the passage 32.

As shown in FIG. 2, the fluid 4 from the discharge outlet 14 enters the passage 32 at a proximal end 46 which is opposite the distal end 34. The proximal end 46 is located adjacent to the tank/pump interface 18. At the proximal end 46, the passage 32 and the receptacle 40, in particular the axis 38 of the receptacle 40, may be parallel to each other. A proximal straight section 48 of the passage 32 includes the proximal end 46. In the shown embodiment, the air bubble filter 44 is received in the proximal straight section 48.

A distal straight section 50 shown in FIG. 2 ends at the distal end 34. The distal straight section 50 at the distal end 34 determines the direction in which the fluid stream 36 of the fluid 4 is discharged from the distal end 34. Between the straight sections 48, 50 is disposed an elbow 52 which may either be curved or include a corner. Due to the elbow 52, the direction 36, from which the fluid 4 emanates from the distal end 34 is different from a direction 54 in which fluid 4 enters the passage 32 at the proximal end 46. In an embodiment, the angle between the directions of the fluid stream 36 and 54 is larger than 90°, and in another embodiment may be around 120°. The housing 41 may comprise a flat section which extends between the proximal end 46, the elbow 52, and the distal end 34.

The tank tube 28, as shown in FIG. 2, extends in front of the distal end 34 of the passage 32 and may in particular be spaced apart from the distal end 34 less than one diameter 56 of the passage 32 at the distal end 34. In another embodiment, the tank tube 28 may be spaced less than one material thickness 58 of the passage 32 from the distal end 34. If the exit velocity of the fluid flow is very low, and the tank tube 28 is spaced apart from the distal end 34 less than one wall thickness of the passage 32, the flow exiting the distal end 34 stays attached to the tank tube 28 even at very low exit velocities.

The tank tube 28 may be located so close to the distal end 34 that a bevel 60 at the distal end 34 is necessary to accommodate the tank tube 28. In the shown embodiment, only a gap 62 having a width of less than half a diameter 56 is provided at the lower part of the distal end 34 for the fluid 4 to exit. This makes sure that the fluid 4 exits the distal end 34 in a flow 64 down the tank tube 28. A virtual linear extension 65 of the passage 32 past the distal end 34 may cross the tank tube 28, crossing the virtual extension of the receptacle 40 along axis 38.

In another embodiment, a wall 66 of the tank 2 shown in FIG. 1 may be located in front of the distal end 34 right where the tank tube 28 is located in FIGS. 1 and 2. In this variant, the fluid 4 from the distal end 34 will hit the wall 66 and flow down the wall 66. This avoids bubbles, but of course does not affect the heat transfer as is the case when the fluid 4 flows down the tank tube 28.

As shown in FIG. 2, a form fit connection 68 may be formed between the tank tube bracket 1 and the tank tube 28, so that the tank tube bracket 1 is fixed both in the direction along axis 38 and perpendicular thereto. Further, the receptacle 40 may not completely enclose the tank tube 28 but provide a clamp with a slot 70 extending along the axis 38, so that the tank tube bracket 1 may be clipped onto the tank tube 28. The form fit 68 may comprise a collar on the tank tube 28 which is received in a complementary opening of the bracket 1.

Figure 4:
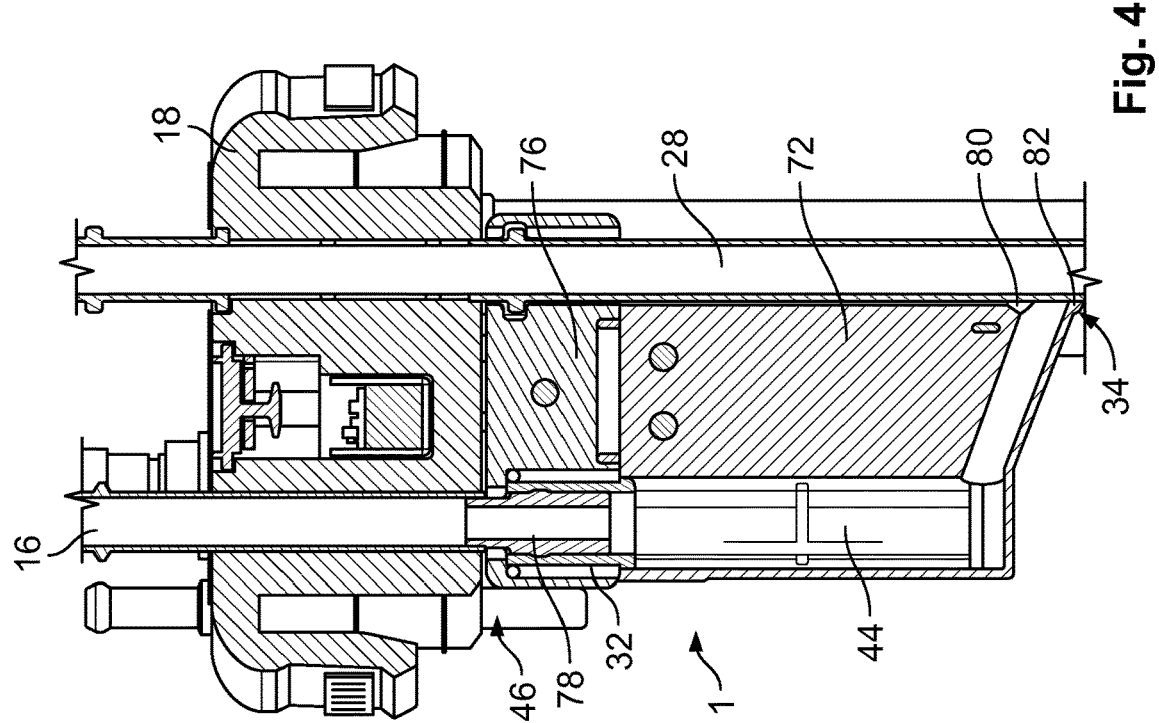
FIG. 4 is a sectional perspective view of the tank tube bracket of FIG. 3.
Figure 3:
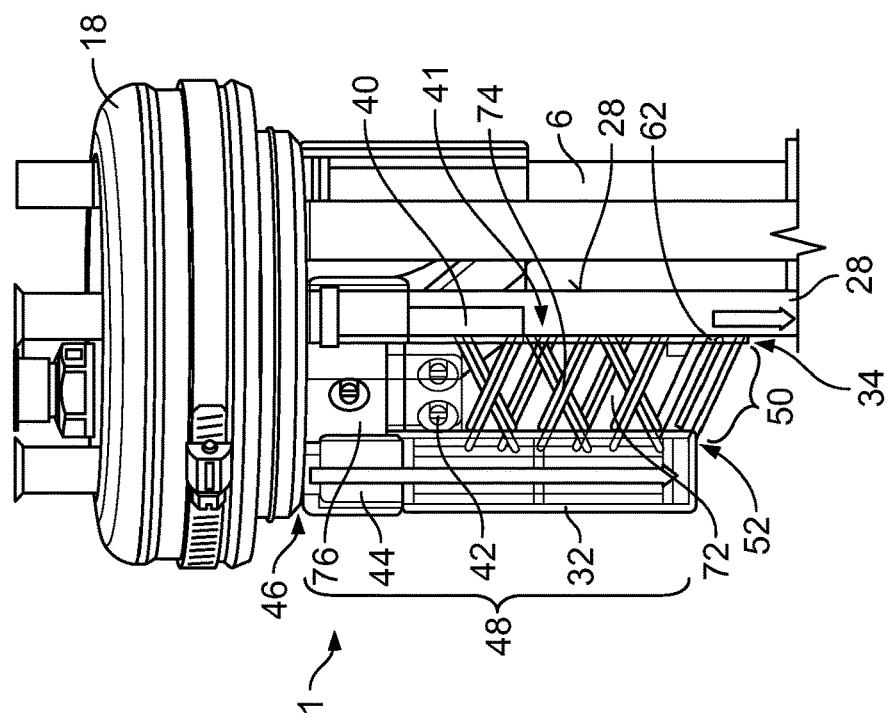
FIG. 3 is a perspective view of a tank tube bracket according to another embodiment.

A tank tube bracket 1 according to another embodiment is shown in FIGS. 3 and 4. Like reference numbers refer to like elements and only the differences from the embodiment shown in FIGS. 1 and 2 will be described in greater detail.

As shown in FIG. 3, the elbow 52 is not curved, but includes a corner. The distal end 34 does not have a bevel 60 but ends in a shape which is complementary to the outer surface or contour of the tank tube 28. Thus, the gap 62 between the distal end 34 and the tank tube 28 may be at least almost constant. The distal end 34 may in particular end in a vertical opening.

The housing 41 of tank tube bracket 1 according to FIG. 3 comprises a lower housing part 72, which is a monolithic unit in which the passage 32 is formed. The lower housing part 72 may be molded or cast unitarily from a resin or metal material or a combination of both. A stiffening structure 74 may be used to increase mechanical strength. Part of the receptacle 40 may be formed in the lower housing part 72.

The lower housing part 72, as shown in FIG. 3, may be attached to an upper housing part 76 by the fixing elements 42. The lower housing part 72 which monolithically forms passage 32 is at the distal end 34, and upper housing part 76 forms the proximal end 46. The upper housing part 76 may be put together from two halves as has been described in FIG. 1 and in particular may comprise the form fit 68. The upper housing part 76 is primarily used for heat transfer and stability, whereas the lower housing part 72 is used for forming passage 32 and directing the fluid 4 onto the tank tube 28 or a wall 66.

In FIG. 4, a cut view onto the dividing plane of the two halves of the upper housing part 76 is shown. Dividing the housing into parts 72 and 76 permits insertion of the bubble filter 44 in the lower housing part 72 before attaching it to the upper housing part 76. Thus, the opening of the passage 32 at the proximal end 46 can be smaller. Further, the dividing plane between the two halves of the upper housing part 76 extends over only a part of the length of the passage 32. Thus, the dividing plane can be bridged more easily, for example, by an adapter 78 which protrudes from the proximal end 46 and allows a fluid-tight connection directly between the discharge line 16 at the proximal end 46 and the lower housing part 72 in which the passage 32 is formed monolithically.

The adapter 78 may seal off the passage 32 between the proximal end 46 and the lower housing part 72, so that no fluid may leak out of the dividing plane of the upper housing part 76. The adapter 78 bridges a dividing line between the two housing parts 72, 76 in a fluid-tight matter, for example, by providing an inner tube which is inserted into the passage 32 and abuts sealingly both the parts 72, 76 of the housing 41. In an embodiment, the adapter 78 abuts the air bubble filter 44 forming a circumferential seal. Such an adapter 78 can be used to connect the passage 32 to, for example, a fluid line. Use of such an adapter 78 permits splitting the housing 41 into two halves as described above without any leakage problems.

As shown in FIG. 4, the tank tube bracket 1 does not need to be fixed to the tank/pump interface 18. It may be sufficient to fix the tank tube bracket 1 onto the tank tube 28 so that the bracket 1 is spaced apart from the tank-pump interface 18.

In order to facilitate the discharge of the fluid from the distal end 34, as shown in FIG. 4, a recess 80 may be provided at an upper edge of the distal end 34 where the housing 41 meets the distal end 34. This allows fluid to emanate above the distal end 34 and increases the attachment of the flow on the tank tube 28. At the lower edge of the distal end 34, a protrusion 82 which extends downwards may be provided to prevent dripping and to better guide the flow along the surface of the tank tube 28.

What is claimed is:

1. A tank tube bracket for a tank, comprising:
   a receptacle extending along an axis and receiving a tank tube;
   a passage adapted to pass a fluid through the tank tube bracket, a distal end of the passage is directed toward the axis of the receptacle, the passage includes an elbow between the distal end and a proximal end of the passage, the proximal end of the passage is opposite the distal end of the passage; and
   a housing forming at least a part of the receptacle and at least a part of the passage at the distal end, the housing has a flat section extending between the proximal end, the elbow, and the distal end.

2. The tank tube bracket of claim 1, wherein the tank tube extends in front of the distal end of the passage.

3. The tank tube bracket of claim 2, wherein a virtual linear extension of the passage beyond the distal end of the passage crosses the tank tube.

4. The tank tube bracket of claim 2, wherein the tank tube is spaced apart from the distal end by a gap that is less than a diameter of the passage.

5. The tank tube bracket of claim 2, wherein a fluid flow exiting the distal end of the passage is at least partly attached to the tank tube and is directed away from the receptacle.

6. The tank tube bracket of claim 1, wherein the housing forms a thermal bridge between the receptacle and the passage.

7. The tank tube bracket of claim 1, wherein the passage includes an air bubble filter.

8. The tank tube bracket of claim 7, wherein the air bubble filter is disposed in and extends along a straight section of the passage.

9. The tank tube bracket of claim 8, wherein the straight section of the passage is disposed between the proximal end and the elbow of the passage.

10. The tank tube bracket of claim 1, wherein the housing is formed of a pair of halves held together by a plurality of fixing elements.

11. The tank tube bracket of claim 10, wherein a dividing plane of the halves crosses both the passage and the receptacle.

12. The tank tube bracket of claim 10, wherein each of the halves is a monolithic part including at least a part of the receptacle and at least a part of the passage at the distal end.

13. A fluid tank, comprising:
    a tank tube bracket including a receptacle extending along an axis and receiving a tank tube and a passage adapted to pass a fluid through the tank tube bracket, a distal end of the passage is directed toward the axis of the receptacle; and
    a sensor device disposed in the fluid tank, the distal end of the passage points in a direction away from the sensor device and is not located vertically above the sensor device, a proximal end of the passage is located vertically above the sensor device, the proximal end of the passage is opposite the distal end of the passage.

14. An assembly, comprising:
    a pump; and
    a tank tube bracket including a receptacle extending along an axis and receiving a tank tube, a passage adapted to pass a fluid through the tank tube bracket, and a housing, the passage is connected to a discharge outlet of the pump and a distal end of the passage is directed toward the axis of the receptacle, the passage includes an elbow between the distal end and a proximal end of the passage, the proximal end of the passage is opposite the distal end of the passage, the housing forming at least a part of the receptacle and at least a part of the passage at the distal end, the housing has a flat section extending between the proximal end, the elbow, and the distal end.

15. A tank tube bracket for a tank, comprising:
    a receptacle extending along an axis and receiving a tank tube;
    a passage adapted to pass a fluid through the tank tube bracket, a distal end of the passage is directed toward the axis of the receptacle; and
    a housing forming at least a part of the receptacle and at least a part of the passage at the distal end, the housing is formed of a pair of halves held together by a plurality of fixing elements, each of the halves is a monolithic part including at least a part of the receptacle and at least a part of the passage at the distal end.

* * * * *